US010430909B2

(12) United States Patent
Mishra et al.

(10) Patent No.: US 10,430,909 B2
(45) Date of Patent: Oct. 1, 2019

(54) IMAGE RETRIEVAL FOR COMPUTING DEVICES

(71) Applicant: Google LLC, Mountain View, CA (US)

(72) Inventors: Parthsarthi Mishra, Mountain View, CA (US); Madhur Khandelwal, San Jose, CA (US); Zihao Wang, Charlottesville, VA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/113,599

(22) Filed: Aug. 27, 2018

(65) Prior Publication Data
US 2018/0365790 A1 Dec. 20, 2018

Related U.S. Application Data

(63) Continuation of application No. 15/007,123, filed on Jan. 26, 2016, now Pat. No. 10,062,133.

(51) Int. Cl.
*G06T 1/00* (2006.01)
*G06F 3/14* (2006.01)
(Continued)

(52) U.S. Cl.
CPC ............ *G06T 1/0007* (2013.01); *G06F 1/163* (2013.01); *G06F 3/065* (2013.01); *G06F 3/068* (2013.01);
(Continued)

(58) Field of Classification Search
None
See application file for complete search history.

(56) References Cited

U.S. PATENT DOCUMENTS

2007/0296738 A1 12/2007 Louch et al.
2008/0108299 A1 5/2008 Hullot et al.
(Continued)

FOREIGN PATENT DOCUMENTS

CN 101834939 9/2010
CN 103106017 5/2013
(Continued)

OTHER PUBLICATIONS

TheUnlockr; "How to Change the Watch Face on the Galaxy Gear;" Youtube video published Jan. 3, 2014; p. 1-3; https://www.youtube.com/watch?v=Z7EBG5aBiZg.*

(Continued)

*Primary Examiner* — Peter Hoang
(74) *Attorney, Agent, or Firm* — Lisa Benado; IP Spring

(57) ABSTRACT

Implementations generally relate to retrieving images from a device for consumption by the receiving device. In some implementations, a computing device may receive from a communication device an update to a collection of images including at least one image not previously received in a prior version of the collection. The computing device may store in long term memory the update to the collection and copy at least one of the images from the update to a non-persistent memory. The images in non-persistent memory may not exceed a maximum threshold. In response to the computing device changing from inactive to active, the computing device may display an image from non-persistent memory as a background image on the computing device. In further response to a minimum threshold number of images in non-persistent memory, the computing device may copy at least one of the new images to non-persistent memory.

20 Claims, 10 Drawing Sheets

(51) Int. Cl.
    *G06F 1/16*     (2006.01)
    *G06T 3/40*     (2006.01)
    *G06T 11/60*     (2006.01)
    *G09G 5/40*     (2006.01)
    *G06F 3/06*     (2006.01)

(52) U.S. Cl.
    CPC .............. *G06F 3/0619* (2013.01); *G06F 3/14* (2013.01); *G06T 3/40* (2013.01); *G06T 11/60* (2013.01); *G09G 5/40* (2013.01); *G09G 2360/121* (2013.01); *G09G 2370/022* (2013.01)

(56) References Cited

U.S. PATENT DOCUMENTS

| | | |
|---|---|---|
| 2011/0264768 A1 | 10/2011 | Walker et al. |
| 2011/0298689 A1 | 12/2011 | Bhomer et al. |
| 2013/0038627 A1 | 2/2013 | Mujkic et al. |
| 2014/0168277 A1 | 6/2014 | Ashley et al. |
| 2014/0317614 A1 | 10/2014 | Djabarov et al. |
| 2015/0119139 A1 | 4/2015 | Ladell et al. |
| 2015/0185811 A1 | 7/2015 | Connell et al. |
| 2015/0193516 A1 | 7/2015 | Harb |

FOREIGN PATENT DOCUMENTS

| | | |
|---|---|---|
| CN | 103649904 | 3/2014 |
| CN | 104660791 | 5/2015 |

OTHER PUBLICATIONS

Derek Walter; "How to Set Up Android's Daydream Screensaver;" Dec. 29, 2015; p. 1-7; https://www.tomsguide.com/us/android-daydream,review-3306.html.*

International Search Report and Written Opinion in PCT Application No. PCT/US2017/012842 dated Apr. 12, 2017, 17 pages, dated Apr. 12, 2017.

International Preliminary Report on Patentability in International Application No. PCT/US2017/012842, 12 pages, dated Aug. 9, 2018.

Communication Pursuant to Article 94(3) EPC in European Application No. 17703494.9, 7 pages, dated May 17, 2019.

First Office Action in Chinese Application No. 201780003565.7, 4 pages, dated Mar. 26, 2019.

* cited by examiner

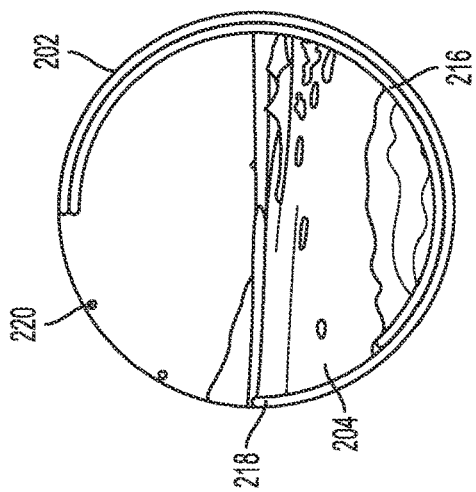
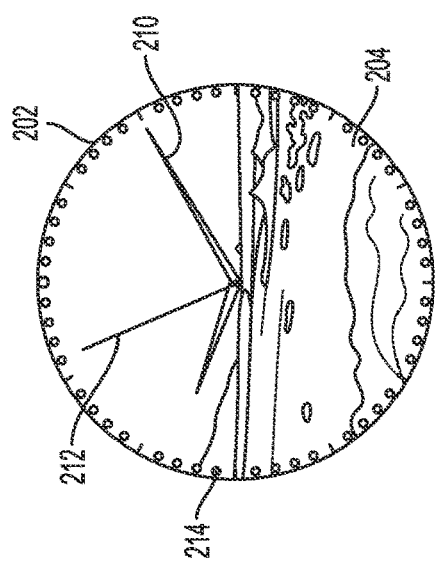
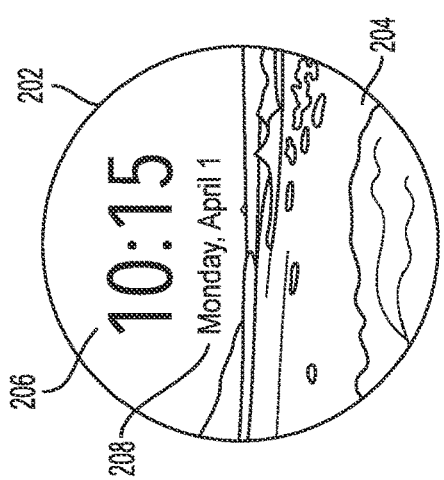

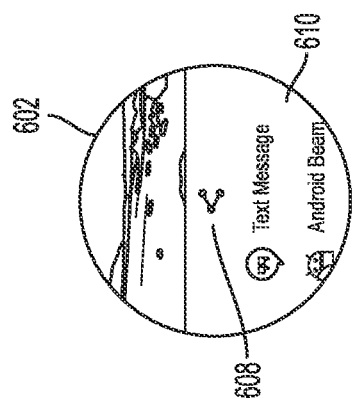
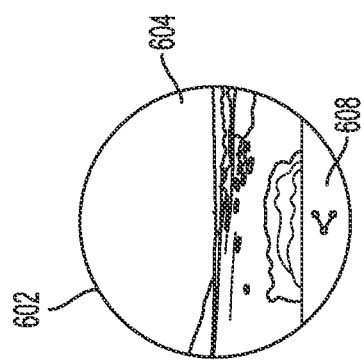
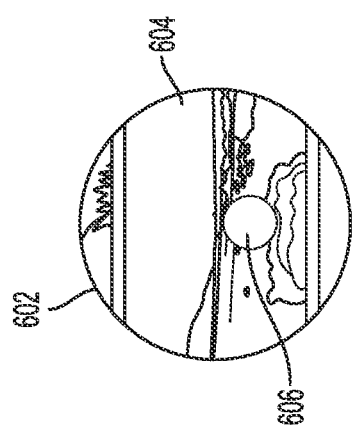

IMAGE RETRIEVAL FOR COMPUTING DEVICES

RELATED APPLICATIONS

This application is a continuation of, and claims priority to, U.S. patent application Ser. No. 15/007,123, filed Jan. 26, 2016, the contents of which are incorporated herein by reference in their entirety.

BACKGROUND

There is much potential to access vast assortments of digital images for consumption by computing devices. Widespread availability of computer devices to communicate with one another expands the accessibility of images. Images may be consumed by being viewed, transferred, projected, displayed, etc. For example, images may be used as background images in computer display screens. Such exploitation of images can entail heavy loads for computer devices that have low processing power, such as wearable devices, e.g. smartwatches. To deal with processing and storage burdens, devices that have limited internal resources can offload some of the computations and substantial storage requirements to computing devices that have greater capabilities.

SUMMARY

Implementations generally relate to retrieving images from a device for consumption by another device. In some implementations, a method may be executable by a computing device, such as a wearable device, to receive an update to the collection of images from a communication device. The update to the collection may include one or more new images that were not included in a prior version of the collection stored by the computing device. The method further may use the computing device to store in a long term memory of the computing device the update to the collection of images. At least one of the images from the update to the collection may be copied to a non-persistent memory as an available image. In some implementations, the available images in non-persistent memory do not exceed a maximum threshold. In response to a change of the computing device from an inactive usage state to an active usage state, the computing device may display at least one of the available images as a background image on the computing device. In further response to the available images in the non-persistent memory reaching a minimum threshold the computing device may copy at least one of the one or more new images to the non-persistent memory. In some implementations, the minimum threshold is lower in value than the maximum threshold.

In some aspects, the update to the collection may be received in response, at least in part, to a charging mode of the communication device. In some implementations, the update may be received in response, at least in part, to an event in a user calendar or to a music piece being played on the computing device.

The method may include determining a change in an image repository of the communication device prior to receiving the update to the collection. In some implementations, the update to the collection of images may include the prior images included in a prior version of the collection stored by the computing device. The update to the collection of images may be stored to replace the prior version of the collection.

In some aspects, the method may include editing the background image based on a display screen shape and size. In some implementation of image editing, a template form may be determined for the display screen shape and size, a content form may be determined within the template form, and the background image may be positioned on the display screen based on the content form. The method may include a template form that is a largest size and shape configured to fit the display screen shape and size.

In some aspects of the computer implemented method a prior version of the collection may be from a previous request for images, wherein the previous request is a user search query. In some implementations, the collection may be an album and the prior version of the album may be from a previous request for images, wherein the previous request is a user selection of the album.

In yet some implementations, a system may be provided and may include one or more processors of a wearable device, a long term memory and a non-persistent memory and one or more computer-readable media having instructions stored thereon that, when executed by the one or more processors, cause performance of operations that may include receiving from a communication device, an update to the collection of images and storing the update to the collection of images in the long term memory of the wearable device. The operations may include copying at least one of the images from the update to the collection to the non-persistent memory as an available image. In response to a change of the computing device from an inactive usage state to an active usage state, the operations may include displaying at least one of the available images as a background image on the wearable device. In response to a minimum threshold number of images in the non-persistent memory, the operations may include copying at least one of the new images to the non-persistent memory. In some implementations, the available images in the non-persistent memory may not exceed maximum threshold. The update to the collection may include one or more new images that are not included in a prior version of the collection stored by the wearable device.

In some aspects of the system, the operations to receive the update to the collection may be in response, at least in part, to a charging mode of the communication device. In some implementations, the operations may include determining a change in an image repository of the communication device prior to receiving the update to the collection.

In some aspects, the operation may include editing the background image based on a display screen shape and size. The editing may include determining a template form for the display screen shape and size, determining a content form within the template form, and positioning the background image on the display screen based on the content form. In some implementations, the template form may be a largest size and shape configured to fit the display screen shape and size.

In still some aspects, a computer implemented method may be executable by a communication device, such as a mobile device, and may include detecting a charging mode of the communication device, determining one or more new images to update a collection of images, wherein the one or more new images are not included in a prior version of the collection provided to a computing device, such as a wearable device. The method executable by the communication device may further include editing the one or more new images according to appearance characteristics of a display screen of the computing device and storing the update to the collection of images in a repository. Based on the charging mode of the communication device, the method may include transmitting the update to the collection of images to the computing device.

In some aspects the method by the communication device may include determining a charging mode of the computing device and providing the update to the collection of images may be in response to the charging mode of the computing device. In some implementations, the method by the computing device may include detecting a minimum power state of the communication device. The charging mode may be detected in response to the minimum power state.

In some aspects, appearance characteristics of a display screen of a computing device may include a display screen shape and size. Editing may include determining a template form for the display screen shape and size of the computing device, determining a main content form within the template form, and editing the image based on the main content form. In some implementations, editing may also include determining one or more separation gap inside of one or more edges of the template form and the main content form is sized to not overlap with the one or more separation gap. In some examples, the template form may be a largest size and shape configured to fit the display screen shape and size of the computing device.

In still other implementations, a tangible, non-transient recordable, computer-readable storage device, such as medium, is discussed to store instructions that cause performance of operations. The non-transitory computer-readable medium may store instructions that receive an update to a collection of images from a communication device to store on a computing device, such as a wearable device. The update to the collection may include one or more new images that were not included in a prior version of the collection stored by the computing device. The instructions may further may provide instructions for storing in a long term memory of the computing device the update to the collection of images and copying at least one of the images from the update to the collection to a non-persistent memory as an available image on the computing device. In some implementations, the available images in non-persistent memory do not exceed a maximum threshold. In response to a change of the computing device from an inactive usage state to an active usage state, the computing device may display at least one of the available images as a background image on the computing device. In further response to a minimum threshold number of images in the non-persistent memory, the computing device may copy at least one of the new images to the non-persistent memory in the computing device.

BRIEF DESCRIPTION OF THE DRAWINGS

FIGS. 2(*a*), 2(*b*), and 2(*c*) are illustrations of example display screens of a computing device, e.g. a wearable device, with various display elements over a background image;

FIGS. 6(*a*), 6(*b*), and 6(*c*) are illustrations of example display screens to sharing an image from a computing device;

DETAILED DESCRIPTION

Figure 1:
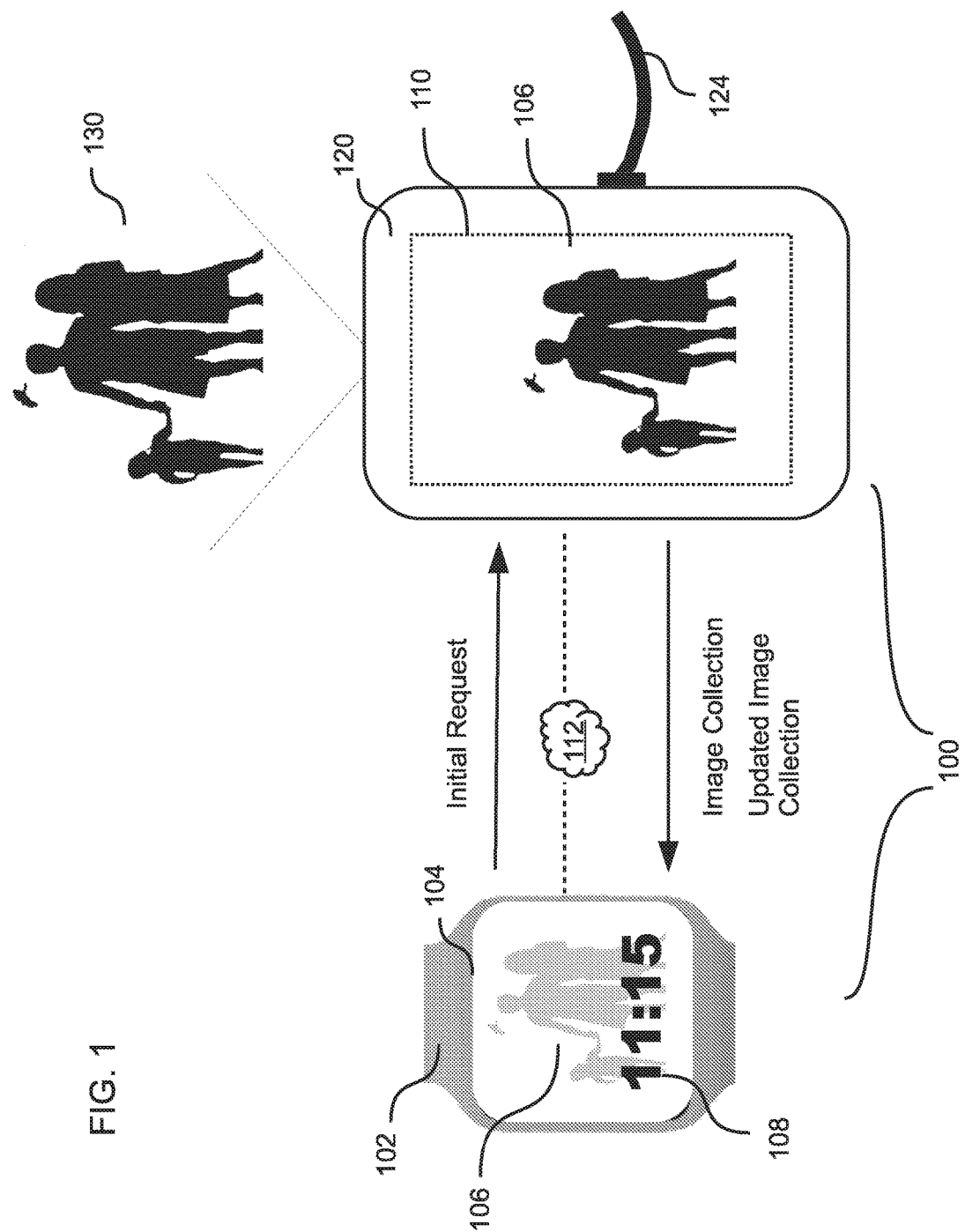
FIG. 1 is a conceptual diagram illustrating an example environment in which various aspects of image collection by a computing device can be implemented in an image retrieval system.

In various implementations, an image retrieval system provides a tool for a computing device to automatically receive images from a communication device. For example, wearable devices, such as smartwatches, headsets, health wearables, etc., may communicate with communication devices, such as mobile computing devices, e.g. smartphones, tablets, laptops, personal computers, servers, etc. to process and obtain image content. In some implementations, the computing device may be a wearable or non-wearable device in which network communication, processing power and/or storage resource may be poor (e.g. slow or unreliable) and/or expensive.

In some implementations a user may request and receive one or more images. For example, a user may request images by entering a search query, by requesting an album of images, and/or by picking one or more particular images. A repository in a long term memory of a computing device may be synchronized with a repository of a communication device that contains images collected in response to a user request. The communication device may receive one or more updates to the repository, e.g. periodically. As such updates are received, in some implementations the communication device may provide them to its repository for automatic syncing with a repository in the memory of the computing device. The communication device may process the images, e.g. edit, prior to providing them to the computing device to prepare the images for consumption.

Automatic syncing may occur without requiring the user to make a new request specific for any updated images. In some implementations, automatic syncing of updated images may occur in response to a triggering event, at regular intervals, or at other times.

In some implementations, one or more images may be pushed from the communication device to the computing device. In further implementations, the images may be pulled from the communication device, responsive to specific requests from the computing device. In some implementations, image transfer may occur while the communication device and/or computing device is charging or otherwise replenishing its power.

The example of updating image collections during charging has the potential to dynamically provide new images to the computing device without burdening the power supply of the communication device and/or the computing device. As a result, there is potential to decrease the number of times, for example, a Bluetooth channel may be open for data transmission. In this example, the Bluetooth channel may only need to be opened while charging, e.g., at night. The computing device may provide the user with new images during non-charging times, e.g., daytime, without the computing device needing to communicate with the communication device, where the user does not change initiate a new request or modify a prior request, e.g. a new search query or different album request.

Images received by the computing device may be stored in long term memory on the computing device and a number of the images may be maintained in a queue and ready for their use. As the computing device enters an active state, one or more images from the queue may be consumed. For example, an image may be automatically popped or otherwise retrieved from a queue and displayed. It may not be necessary for the user to specifically request a next image to be displayed. An image may be displayed, for example, as a new background image behind other data and control elements on a display screen of the computing device. Such automatic image updates may require fewer communications to retrieve updated image collections and may assist in conserving power usage for either or both of the computing device and communication device.

In some implementations, a predefined number of retrieved images may be maintained in a queue by the computing device for consumption. Various types of consumption may be available for images by the computing device. For example, the images may be displayed (e.g. shown on a display screen), projected (e.g. rendered onto a physical space), shared (e.g. emailed, instant messaged, text messaged, video conferenced or posted to websites), edited (e.g. user directed editing from a display screen), or printed (e.g. sent to a printer device). As images are retrieved and rendered from a non-persistent memory of the computing device, a particular number of the retrieved images may be replaced with images from the long term memory of the computing device. In this manner, a predefined number of images, e.g. minimum threshold, may be ready for use with a potentially diminished latency period.

The image retrieval system may further adapt images to a variety of display screens on different computing devices. Some such editing processes may include geometric editing of images based on determined appearance characteristics of a given display screen, such as the shape, size, surface texture and flatness and/or sphericity of the display screen. A template form, such as a square, rectangle, square, etc., may be tailored to the display screen. In some implementations, the template form may be sized to the greatest dimensions that fit within the display screen, e.g. a largest square form. A content form may be shaped and sized within the template form and provide the platform for image. The image may be adjusted to at least substantially fit within the content form.

In some implementations, an image may be displayed as a background image on a display screen, such as on a face of a smartwatch. In some examples, a background image may include an image displayed behind other data, icons and control elements. A background image may also be a screen-saver, such an image displayed when the user has not engaged the device for a particular amount of time. A background image may also be part of a lock screen, be part of a home screen, etc.

In some implementations, new images may be automatically displayed when the computing device, e.g. wearable device, transitions from an inactive usage state (e.g. timeout, idle or ambient mode) to an active state (e.g. mode in which the computing device is available to interact with the user, such as the user manipulating or viewing the display screen or an application on the computing device, or a period of time after such interaction). The inactive usage mode may occur, for example, by request of the user, by a triggering event or automatically at pre-designated times.

Specific user commands for new background images may not be required for display of the new background images. The appearance of updated images may appear seamless from the user's perspective, without the need to launch an application to retrieve new images. For instance, in some examples it may be advantageous for a computing device, e.g. a smartwatch, to be able to refresh new images without requiring the computing device user to manually navigate through a potentially myriad of images and select images.

As an example, if a smartwatch user has recently taken photographs during a family vacation to Hawaii, the vacationing user can enjoy viewing the vacation photographs on her smartwatch as she continues with her daily activities. At some point during her trip, the vacationing user in this example had requested that her smartwatch retrieve an image album entitled, "vacation". Upon this initial request for images in the album, the smartwatch may retrieve just a small number of photographs from the user's smartphone that meet the user's request criteria and quickly display the initial results. From the user's prospective, the results of her search query instantaneously appear on her smartwatch face. In the background, the smartwatch may continue to gather photographs that meet the search criteria and store these remaining photographs in long term memory, e.g. a hard disk, solid state drives, and the like. As the user finishes looking at the initial photographs, a number of the remaining photographs may be placed into queue for continuous viewing by the user. Her viewing of images on her smartwatch appears seamless.

Upon the vacationing user's return, she charges her devices to prepare for work the following day. During a period in which her smartwatch was charging, her mobile phone had pushed to her smartwatch a collection having new photographs from her trip. This updated collection may include recent photographs that she had not previously viewed on her smartwatch.

Periodically during this user's work day, her smartwatch switches to an idle mode showing a minimum user interface display, such as a black background with white text and graphics. When she glances at her smartwatch, the smartwatch flips from an inactive state to an active state. Without this user having requested updated photographs, the smartwatch face automatically shows a new background image from her recent vacation. Throughout the day, a shuffling of new images appear from her vacation as the smartwatch switches from inactive to active states, prompting her co-workers and friends to inquire about her trip. Throughout the vacationing user's day, she reflects on moments from her trip.

Images displayed on a computing device, such as a wearable device, may enhance aesthetics, evoke an emotional response, aid in athletics, health and medical efforts, provide information, e.g. environmental conditions, etc. Images may include still images (such as photographs, graphics, drawings, etc.), animated images, motion videos, etc. in some instances, images may be images personal to a user, for example, images that make visible ongoing stories of a user's life and serve as visual footprints marking where the user has been. Some examples of personal images include photographs taken by a user, photographs of a user taken by another, self-portraits by a user, photographs of subjects familiar or close to the user taken by another, etc. In some implementations, the images may also include postings from social media. For example, a user may receive updated images posted by others, such as friends, family members, organizations, etc.

In still some implementations, images may be non-personal in nature, including visual representations of data, such as sensor information, depictions for interactive purposes, picture notifications, etc. Other examples of personal and non-personal images are also possible.

FIG. 1 illustrates an example environment in which to implement some embodiments of an image retrieval system 100 to enable a user to receive images on the computing device 102. The image retrieval system 100 includes a computing device 102 and a communication device 120, both of which may connect with each other (as shown by phantom link lines) over a network 112 to implement the retrieval of images. Although one communication device 120 is shown, more than one communication device 120 may be included in the image retrieval system 100.

While a mobile phone is shown in FIG. 1 as an example of a communication device 120, other types of communication devices could additionally or alternatively be used. The communication device 120 in accordance with various embodiments may be any computing device, e.g. mobile computing device, capable of transmitting images to computing device 102 as well as determining and processing input, with or without image capture elements. For example, a server, e.g. a server in a cloud storage implementation, notebook computers, a laptop computer, a netbook, a tablet computer, a media device, desktop computers, game console, are among the suitable communication devices capable of transmitting images to computing device 102.

In the example shown in FIG. 1, the communication device 120 includes a display screen 110 and an image capture element (not shown). The display screen 110 may be a TFT (thin-film transistor) liquid crystal display, an OLED (organic light emitting diode) display or other suitable display technology. The communication device 120 may display on the display screen 110 an exemplary image 106 captured by the image capture element of the communication device 120. In this example, the image 106 depicts a scene 130 of a family portrait. The image 106 may be modified by the communication device 120 and stored in a collection of one or more images to be provided to the computing device.

In some implementations, the image 106 may be captured, edited or otherwise created by other image capture devices. The image 106 may be received by communication device 120 from the other image capture devices or from other image collection sources. For example, the communication device 120, such as a mobile computing device, e.g. mobile phone, may fetch image results from image collection sources, such as a server. In some implementations, images curated by a third party may be streamed to the communication device. The collecting of images by the communication device 120 may be in accordance with a user request, e.g. subscription for images from a third party source, or images may be collected by the communication device 120 without a user request.

The communication device 120 may prepare, e.g. modify and store as a collection member, the image 106 for transfer to the computing device 102. The image 106, e.g. newly captured family portrait photograph, may be stored by the communication device as a new image to update a prior collection of images. For example, an initial request may have been made by the computing device for an album entitled, "family". The image 106 may be identified as a new photograph to the family album. For example, the communication device 120 may assess the image 106, upon user consent, and determine that the new photograph includes family members. In certain implementations, with specific consent by the user, the communication device may analyze visual content of the image, such as through image recognition analysis, determine metadata of the image, etc., to determine images for the collection. The image 106 may also be identified as belonging to a collection by the user or otherwise identified. The revised collection with the family portrait image 106 may be ready to be provided to the computing device 102 as an update to the prior request for images in a family album collection.

In some implementations, the computing device 102 may synchronize with the communication device or otherwise receive images, e.g. updated images, when the communication device 120 is in a charging mode to replenish power to the communication device. In some implementations, the communication device 120 may seek new images to update a collection of images when the communication device 120 is in a charging mode. In some implementations, a minimum power state of the communication device and/or computing device, e.g. 50% power in a battery remaining, 80% battery remaining, 2 hours of battery remaining, etc., may trigger the image retrieval system 100 to delay transferring images to the computing device 102, collecting of images by the communication device and/or processing of images by the communication device until the charging mode. For example, detection of 50% or less power for the device(s) may require the device(s) to wait until a charging mode to perform one or more of the steps in image transfer. Once the communication device and/or computing device is in a charging state, the delayed operations may proceed according to the processes described herein.

A power source, e.g. charger, computer, vehicle, etc., may connect with the communication device 120 and commence a charging mode for the communication device 120. Communication with the power source may be, for example, through a power cable 124, e.g. USB cable, attached to a port on the communication device 120. Various power sources may be employed, which may or may not employ a power cable 124. In some implementations, charging may take place through a wireless connection to a power source that emits a current. Other implementations of converting or inducing power are possible to charge the communication device, e.g. motion induced charging.

In still some implementations, the communication device 120 may monitor its power level and/or receive indication of a power level of the computing device 102. The image collections may be updated and provided at periods based on the power levels. For example, the communication device 120 may update image collections and may push image updated collections to a computing device 102 when the power level of the communication device is at or above threshold power level, e.g. 50% battery remaining, 80% battery remaining, 2 hours of battery remaining, battery fully charged. Below such as a power level, the communication device 120 may update collections less frequently or wait until the communication device 120 is in charging mode to update and push the image collections.

The communication device 120 may determine one or more changes to an image collection and automatically push the updated collection to the computing device 102. In still some implementations, the computing device 102 may receive updates to a collection at predetermined times, e.g. at nighttime, in response to a triggering event, such as receipt of a notification that the communication device is in a charging mode or receipt of notification that a collection of images has been updated, or on-demand in response to a user request.

In some implementations, an application running on the computing device 102 may initiate a request for images and provide criteria for a collection of images. In some implementations, images may be selected in a smart manner. For example, a music application may request images related to a particular music piece being played, or otherwise available, on the computing device. For instance, an update to a music library may trigger a request for and/or selection of images to correspond with the updated music library. In another example, images may be requested based on context of the user's scheduled calendar. The computing device and/or communication device may, with user consent, access a user's calendar and determine a particular event is to occur. For example, if the calendar indicates that a user is scheduled to participate in a sporting event, sport related images may be pushed to the computing device at a period before, during or after the event.

In some implementations, the images may be provided to the computing device 102 in a staggered manner, such as in response to a user request for images. A first portion of a collection of images may be immediately sent by the communication device 12 upon the communication device receiving an initial request from the computing device 102. The first portion may include a particular number of available images that the user may begin using. For example, the first portion may include three images that may be displayed for the user to view. In some implementations, the first portion of the image collection may be deposited into a queue in the computing device 102 for rapid consumption by the user. As the user consumes the first portion of the collection of images, the communication device 120 may continue gathering any additional images to add to the collection and push a second portion of the collection to the computing 102 device. The second portion images may be received in the background of the computing device 102 as they are gathered and pushed from the communication device 120. When the user completes viewing the first portion of the collection, the second portion of the images may be ready to be consumed by computing device.

In some implementations, the second portion represents the remaining collection of images. In still some implementations, the second portion includes less than the remaining total collection of images. In these cases, the communication device may continue gathering images for the collection and sending portions of the collection to the computing device 102. The staggered transfer of images may repeat for any number of portions, e.g. third portion, fourth portion, etc., of the image collection.

Such transmissions of staggered portions of images may enable smaller amounts of data to be provided to the computing device once the data is ready for transmission. The computing device may quickly render the portions of images while the communication device fetches more data. In this manner, a user may experience a quick response time in obtaining images for a request for images, e.g., in response to a search query or request for an album.

The computing device 102 may gather image collections across one or more networks 112. Communications across the one or more networks 112 may include privacy and security measures, such as encryption and password protection. The network 112 may include one or more WANs (Wide-Area Networks) and/or LANs (Local-Area Networks), which may be wired and/or wireless. In some examples, the network 112 may include one or more cellular networks and/or the Internet, among other networks. In some examples, a local network such as a Bluetooth™ network is employed for communication between the computing device 102 and the communication device 120. In some implementations, computing device 102 and communication device 120 may couple with each other using near-field communication (NFC) technology. In still some implementations, computing device 102 and communication device 120 may be physically coupled to exchange information. Although the network 112 is shown as a single network, it should be understood that the network 112 may include multiple, distinct networks that are themselves communicatively linked. The network 112 could take other forms as well.

The network 112 may operate according to one or more communication protocols, such as Bluetooth™, LTE (Long-Term Evolution), CDMA (Code Division Multiple Access), WiMax (Worldwide Interoperability for Microwave Access), WiFi (Wireless Fidelity), WiFi Direct (Wireless Fidelity Direct), EDGE (Enhanced Data rates for GSM (Global System Mobile) Evolution), 3G (Third Generation), 4G (Fourth Generation), HTTP (Hyper-Text Transfer Protocol), TCP (Transmission Control Protocol), SIP (Session Initiation Protocol), device contact based transfer protocols, device movement based pairing protocols, and other communication protocols.

While FIG. 1 illustrates a smartwatch as a type of a computing device 102, other types of wearable devices or other non-wearable computing devices could be used that may receive updated images for consumption from a communication device. Wearable devices are worn in contact with a user's body or close to the body. For example, the computing device 102 may be a wearable device that serves as a clip, a band, a watch, jewelry, goggles, glasses, contact lens, apparel, an accessory, an attachment part to a wearable item, etc. In some implementations, images may be viewed on a display screen of the computing device worn by the user. For example, the user can view the images on a display of a smartwatch or a smart wristband, a head-mountable device (HMD), a ring for finger wear, etc.

Some wearable-type computing devices include, or are used primarily as, health or athletic devices. For example wearable devices may be configured to monitor physiological states, provide health information and administer health care. Such health wearables may include at least one sensor to measure bio-signals or environmental components.

In some implementations, the computing device is an augmented reality device to superimpose an image onto an environment. For example, a computing device may be a wearable device with a camera and projector to project one or more images and detect user interaction with the projected image. Such augmented reality devices may include input of privacy permissions for their use, such as where image recognition software is employed.

It should be understood, however, that other types of computing devices may be configured to provide similar image retrieval functions and/or may include similar components as those described in reference to wearable devices and smartwatches.

Display screen 104 on the computing device 102 may be used to display various user interfaces. The display screen may be a TFT (thin-film transistor) liquid crystal display, an OLED (organic light emitting diode) display or other suitable display technology.

The image 106 may be displayed on display screen 104. For example, image 106 may be displayed as a background image to one or more display elements. Various display elements, such as watch time 108 may be displayed on the display screen 104 over the background image 106. Display elements may also include date, sensor outputs, e.g. pedometer reading, weather data, emails, a menu of available commands, etc. In some implementations as described below, the image 106 may be edited by the communication device 120 and/or computing device 102 for use on the computing device.

FIGS. 2 (a), (b), and 2 (c) show various formats of a display screen 202 of a smartwatch type of computing device having display elements displayed on top of background image 204. For example, image 106 may be used as background image 204. FIG. 2 (a) illustrates display elements of a digital time 206 with numbers and a date 208. FIG. 2 (b) shows a traditional analog face with hour and minute hands 210 extending and rotating from a center point with a second hand 212 and minute markings 214 around the periphery. FIG. 2 (c) shows circular arms 216, 218 to show time in hours and minutes, respectively, and five minute markings 220 around the periphery of the watch face. Many other types of computing device faces are possible.

In the examples in FIGS. 2 (a) to (c), the display screen 202 is circular in shape and the background image 204 is edited to encompass the entire watch face. In some implementations, the background image 204 may be shown on a portion of the display screen 202. Display screens for the computing device may have various appearance characteristics with different shapes, sizes and flatness or curvature. In some implementations, the display screen may be a stereo display to convey perception of depth.

In some implementations, geometric editing of images may provide standard image shapes and sizes for various display screens. Geometric editing of images may be performed by the communication device 120, computing device 102 or other computing device. FIGS. 3(a) to (f) show some an example of a geometric editing process for a flat, circular shaped display screen, FIG. 3(g) shows a geometric edited image on a flat square display screen and FIG. 3(g) shows a geometric edited image on a flat rectangular display screen. The geometric editing process may be implemented by an application stored in the communication device 120, computing device 102 or other device, e.g. in a combination of communication and computing devices 120, 102 and servers, or in one device 120, 102 or servers. The geometric editing application may be code and routines configured to edit images in accordance with display screen appearance characteristics.

Figure 3A:
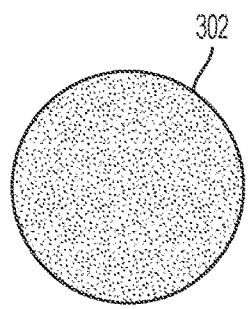
FIGS. 3(*a*), 3(*b*), 3(*c*), 3(*d*), 3(*e*), 3(*f*), 3(*g*), and 3(*h*) are schematic diagrams illustrating examples of geometric editing for various display screens of a computing device, e.g. a wearable device, in which FIGS. 3(*a*)-(*f*) show an example of a geometric editing process for a flat, circular shaped display screen, FIG. 3(*g*) shows a geometric edited image on a flat square display screen and FIG. 3(*g*) shows a geometric edited image on a flat rectangular display screen.
Figure 3B:
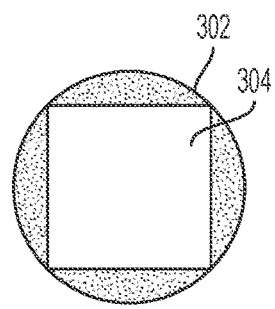

In FIG. 3(a) a base display screen 302, e.g. blank screen, having appearance characteristics, such as a shape (e.g. circular), size, surface texture, rigidity, flatness and/or sphericity may be provided. The base display screen 302 may show any color, pattern, graphic, etc. In FIG. 3(b) the geometric editing process may include determining a template form 304 according to overlay the base display screen 302. The template form 304 may be a certain shape that is sized according to the appearance characteristics of the display screen. The template form 304 may be used as a guide to edit the image for tailoring to the display screen. For example, the template form 304 may be a maximum size of a shape that may fit within the base display screen 302, such as a largest square form in a circular or oval display screen or such as a largest circular or oval form in a rectangular display screen. In some implementations, the template form 304 may be smaller than the base display screen 302 and positioned for a portion of the screen. In still some implementations, the template form 304 may encompass the entire base display screen 302.

Figure 3C:
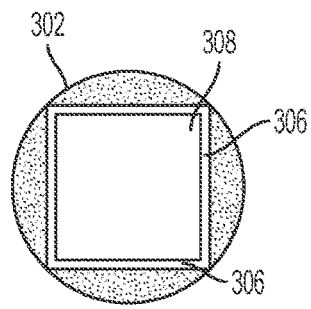

In some implementations, as shown in FIG. 3(c), the geometric editing process may include determining one or more separation gaps 306 sized within the template form 304, for at least a portion of the periphery, e.g. peripheral edges or arcs, of the template form 304. The separation gap 306 may be formed by pixel padding and may create a space between one or more images and the edges of the display screen. In some implementations, the separation gap 306 may serve as a border between multiple images. The separation gap may be any shape, size, dimension (e.g. length and width), such as 8 pixels wide. In some implementations, various sizes and shapes of multiple separation gaps 306 may be used.

Figure 3D:
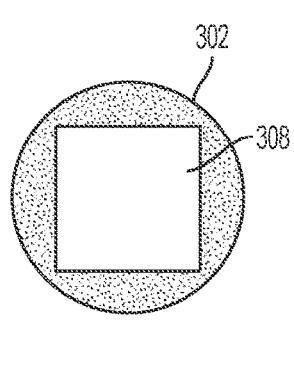

The geometric editing process may further include determining one or more main content form 308 at least substantially positioned within the template form 304 and outside of (e.g. without overlapping with) the separation gap 306. In some implementations, the inner edge of the separation gap 306 may define the shape and size of the main content form 308. The main content 308 form may not overlap with the separation gap 306. The main content may provide for a focal image to appear on the base display screen 302. In some implementations, the main content form 308 may be sized, shaped and positioned to fit within the inner edge of the separation gap 306 of the template form 304. In some implementations the inner borders of the separation gap 306 define the outer borders of the main content form 308. As shown in FIG. 3(d), the geometric editing process may further include removal of the template form 304, maintaining the main content form 308 in position on the base display screen 302.

Figure 3E:
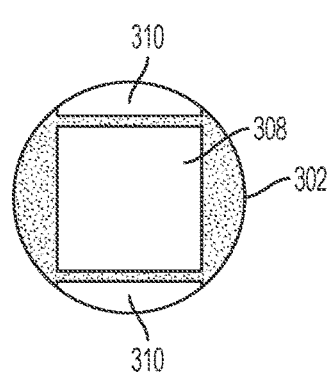

In some implementations, shown by example in FIG. 3(e), one or more additional content forms 310 may be determined in whole or in part by the geometric editing process. The additional content forms 310 may provide for positioning of images on the base display screen 302. In some implementations, the additional content forms 310 enable images to shift positions on the base display screen 302 into the position of the main content form 308 by scrolling, voice commands, touch commands, etc. In some implementations, the additional content forms 310 may be determined to replicate at least a portion of the main content form 308 in size and shape to enable images to appear to be partially on the base display screen 302 and partially off of the base display screen 302. The additional content forms 310 may be spaced apart from the main content form 308 by separation gap 306. FIG. 3(e) shows a film-strip layout for images. A film-strip layout may be capable of vertical or horizontal scrolling. Other layouts may be used for content forms 308 and 310 on the base display screen 302.

The size and shape of the main content form 308 may be used by the geometric editing process to determine editing parameters, e.g. size and shape, for images to appear to fill the main content form 308. The position of the content forms 308 and 310 on the display screen may further be used to determine the location of images on the base display screen 302.

Figure 3F:
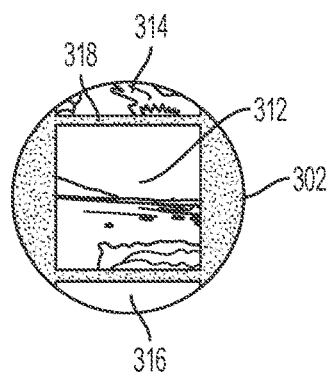
Figure 3G:
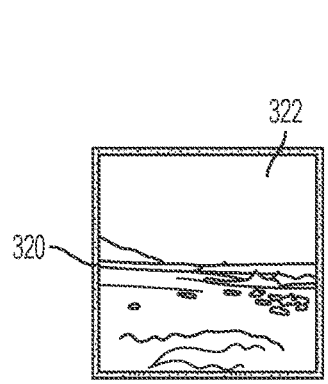

In FIG. 3(f), images, edited according to the geometric editing process, may be positioned at the location of the content forms on the base display screen 302. The main content form 308 may provide for placement of a main image 312 on the display screen 302. The main image 312 (e.g. image 106 received from the communication device 120 in FIG. 1) may be positioned at the location of the main content form 308. In some implementations, multiple additional images 314 and 316 may be displayed in whole or in part at the location of the one or more additional content forms 310. The main image 312 and additional images 314 and 316 may dynamically update as new images are modified according to the geometric editing process. For example, a user may scroll forward and backward through images enabling changes to the images positioned by the main content form 308 and additional content forms 310.

A space 318 between images may be created by the separation gap 306 of the template form 304. The space 318 may be any color, pattern, graphic, etc.

Figure 3H:
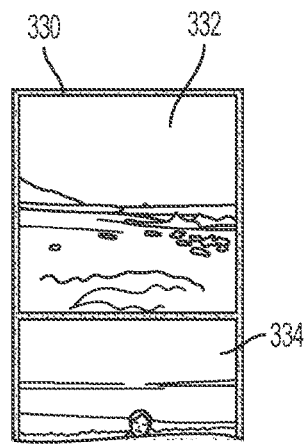

In FIG. 3(g) a square display screen 320 includes a square image 322 edited according to the geometric editing process shown in FIGS. 3(a) to (d). In this example a single main image 322 is displayed and no additional images are displayed. In this example, additional content forms are not used to position images on the display screen 320. In FIG. 3(h) a rectangular square display screen 330 includes a square main image 332 edited according to the geometric editing process shown in FIGS. 3(a) to (f), where only a main image 332 is displayed. In this example, a partial additional content form may be used to position one additional image 334.

Figure 4:
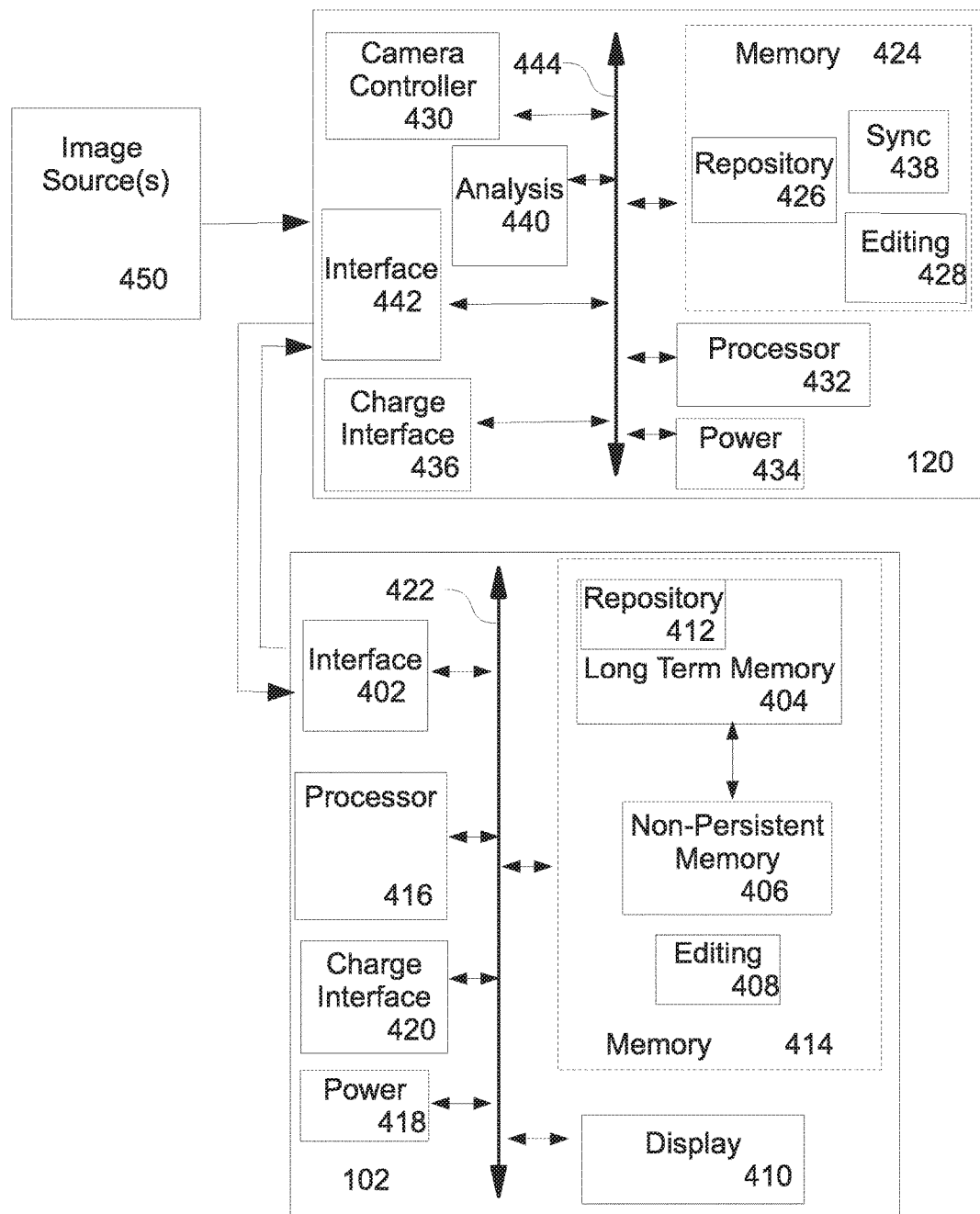
FIG. 4 is a schematic diagram illustrating one example of an image collection by a computing device from a communication device.

FIG. 4 illustrates a block diagram of example computing device 102 and communication device 120. The computing device 102 includes components, which may include a memory 414, processor 416, display 410, power component 418 and interface 402 to obtain and consume images. The computing device 102 may include a power component 418, e.g. a battery, which connects with a power source through a charging interface 420. Components of computing device 102 may be communicatively coupled by a bus 422.

The communication device 120 may include a memory 424, processor 432, camera controller 430, power component 434 and interface 442 to collect and transfer images. Communication device 120 may also include a power component 434, e.g. battery, which may connect to a power source through a charging interface 436. Components of the communication device 120 may be communicatively coupled by a bus 444. Computing device 102 may synchronize with an image repository 426 of the communication device 120 by a sync module 438 of the communication device 120 and through an interface 442 of the communication device 120.

In some implementations, the communication device 120 may receive a request for images, such as a search query, album identification, etc., through interface 442 from the computing device 102. In response to the request, the communication device 120 may gather one or more images into a collection, optionally prepare the images, e.g. edit images, and store the collection in the image repository 426.

In some implementations, camera controller 430 may capture images for collection and storage by the communication device 120. The images may also be created by other components, such as a drawing tool, of the communication device 120. In some implementations, one or more external image source(s) 450, such as a server storing a cloud based photo library, a photo stream source, social networks, etc., may provide the communication device 120 with one or more images through interface 442. Memory 424 of the communication device 120 may store the images.

In some implementations, the image retrieval system 100 enables proprietors of images, e.g. creators, keepers, controllers or owners of images from image source(s) 450 to specify and/or consent to the use of their images by the communication device and computing device. Proprietors of images may provide consent to use of certain information related to the images, which may include behaviors associated with capturing images and use of capture devices, identity information in recognizing people identified in images, etc. For example, the image retrieval system 100 may provide users with multiple selections directed to specifying and/or consenting to the use of particular information. For instance, selections with regard to specifying and/or consenting may be associated with particular capture devices, applications and components of a capture device, individual images, all images, individual photo albums, all photo albums, etc. The selections may be implemented in a variety of ways. For example, the image retrieval system 100 may cause buttons or check boxes to be displayed next to various selections. In some implementations, the image retrieval system 100 may enable users of a social network to specify and/or consent to the use of using their images for object recognition, including facial recognition, in general.

In addition, certain data may be treated in one or more ways before it is stored or used by the communication device 120 and computing device 102, so that certain information is removed. For example, an identity of a person may be treated so that no identifying information can be determined, or a geographic location may be generalized where location information is obtained (such as to a city, ZIP code, or state level), so that a particular location of a person cannot be determined. Thus, a proprietor of images may have control over how information is collected and used by the image retrieval system 100.

Analysis module 440 of the communication device 120 may be a set of instructions executable by the processor 432 to analyze images and determine images for an image collection, such as visual content of the image, metadata associate with the image, etc. Where the user has consented to use of images, analysis module 440 may employ various object recognition techniques to identify objects represented in an image to determine images for a collection. For example, tree and sky segmentation, face detection (in which a user has specifically consented to the use of face detection techniques), facial recognition (in which a user has specifically consented to the use of facial recognition techniques), a variety of learning techniques such as neural network processes, and other processes or combinations of processes to identify objects may be used. The object recognition processes may be specific for the type of images being processed. For example, nature images may be processed with object recognition techniques that detect objects commonly found in nature. Such recognition techniques may be integral to the analysis module 440. The communication device 120 may also access recognition techniques by software or hardware that is external to the communication device 120. In some implementations, a server, such as a server that is an image source 450, may provide recognition techniques, as well as additional image processing techniques.

In some implementations, in order to recognize an object, the analysis module 440 may compare and match the object (e.g., image of the object) to reference images. In some implementations, communication device 120, the image source 450, or other computing device, may search reference images in order to identify any one or more reference images that are similar to the object in the image. For a given reference image, features may be extracted from the image of the object for analysis, and then compared to those of one or more reference images. For example, analysis may be performed with user consent on the relative position, size, and/or shape of object features such as facial characteristics, body characteristics, etc. In some implementations, data gathered from the analysis may be used to match the object in the image to one more reference images with matching or similar features. In some implementations, multiple reference images may normalized and object data compressed from those images into a composite representation having information (e.g., object feature data), and then the object in the image may be compared, with user consent, to the composite representation for facial recognition. In some implementations, where the user consents to use of such information, location information in which the images where captured and context of surrounding objects may be used in the object recognition. For example, a tennis player may be recognized on a tennis court and children may be recognized near a school or playground.

In some scenarios, the object in the image may be similar to multiple reference images associated with the objects in the same category. As such, there would be a high probability that the object associated with the object in the image is the same type of object associated with the reference images.

In some implementations, to facilitate object recognition, the analysis module 440 may employ geometric recognition techniques which are based on feature discrimination. Further, photometric techniques may be used by the analysis module 440, which are based on a statistical approach that distills an object feature into values for comparison. A combination of the geometric and photometric approaches could also be used when comparing the object in the image to one or more references.

Other recognition techniques may be used by the analysis module 440 of communication device 120 or other devices. For example, the analysis module 440 may use recognition techniques that use one or more of principal component analyses, linear discriminant analysis, elastic bunch graph matching, hidden Markov models, and dynamic link matching. It will be appreciated that the analysis module 440 of communication device 120 or other devices may use other known or later developed recognition techniques, and/or systems.

In some implementations, the image repository 426 of the communication device 120 may be updated with an updated collection having new images and images previously provided in the collection for a previous request for images. The updated collection may replace a past collection in the image repository 426. The past collection may have been gathered in response to the request for images received through interface 442.

In various implementations, images identified for a collection and received from the image source 450 may be stored in memory 424, modified by editing module 428 or provided directly to the image repository 426 of the communication device 120. In some implementations, the editing module 428 may be a set of instructions executable by the processor 432 to edit images for consumption by computing device 102. In some implementations, the editing module 428 may be stored in the memory 424 of the communication device 120 and may be accessible and executable by the processor 432. In some implementations, the editing module 428 may be implemented using hardware including a field-programmable gate array (FPGA) or an application-specific integrated circuit (ASIC). In some other implementations, the editing module 428 may be implemented using a combination of hardware and software.

One or more images from memory 424 may be edited by editing module 428, such as in response to a user search query from the computing device 102. Images may be edited by the editing module 428 to create an image that meets requirements of the computing device 102, of a display screen of the computing device 102 (e.g. OLED, LCD, etc.), or is otherwise suitable for consumption by the computing device 102. For example, the image may be compressed, cropped, reformatted, color-depth adjusted (e.g. 16-bit, 32-bit, etc.), resolution adjusted, or otherwise processed to make the image compatible or suitable for use with the computing device 102. Other editing techniques may also be employed by the communication device, such as processes to improve quality, add effects to the image, create animation, e.g. animated GIF (Graphics Interchange Format), produce 3D imaging, etc. Images ready for receipt by the computing device 102 may be stored in the image repository 426, including images modified by editing module 428.

The computing device 102 may synchronize with the image repository 426 to retrieve images stored in the image repository 426. Sync module 438 may be a set of instructions executable by the processor 432 to direct synchronization of images with the computing device 102. In some implementations, the sync module 438 may be stored in the memory 424 of the communication device 120 and may be accessible and executable by the processor 432. In some implementations, the sync module 438 may be implemented using hardware including FPGA or an ASIC. In some other implementations, the sync module 438 may be implemented using a combination of hardware and software. In some implementations, the computing device may include a sync module, in addition to or in place of sync module 438 of the communication device 120.

The images may be received by the computing device 102 through interface 402. Interfaces 402 on the computing device 102 and 442 on the communication device 120 enable communication with remote devices (e.g., capture devices, servers, other computing devices) over one or more networks 112 (shown in FIG. 1). Interfaces 402 and 442 can include an Ethernet adapter, USB (universal serial bus), wireless interconnection components, or other wired or wireless standards-based or proprietary interfaces. Interfaces 402 and 442 may be configured to enable communication through a variety of communication protocols, including Bluetooth™ LTE, CDMA, WiMax, WiFi, WiFi Direct EDGE, 3G, 4G, HTTP, TCP, SIP, device contact based transfer protocols, device movement based pairing protocols, and other communication protocols. The communication between the computing device 102 and communication device 120 through interfaces 402 and 442 may include a request for images, such as a user search query.

In one exemplary method, a search query may be used to make an image request on the computing device 102. For example, the request may be to replace a background image on the display screen 502 shown in FIGS. 5 (a), (b), (c) and (d). Other types of image requests may also be employed using various inputs and display screens.

Figure 5D:
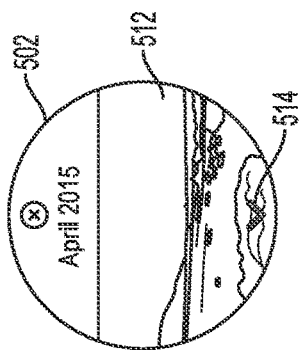
FIGS. 5(*a*), 5(*b*), 5(*c*), and 5(*d*) are illustrations of example display screens to provide a search query on a computing device.
Figure 5C:
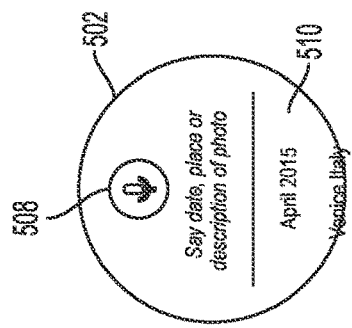
Figure 5B:
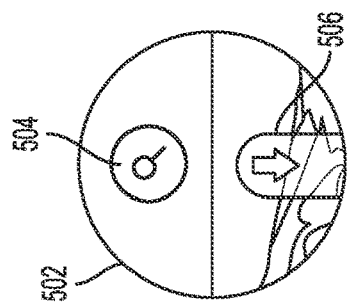
Figure 5A:
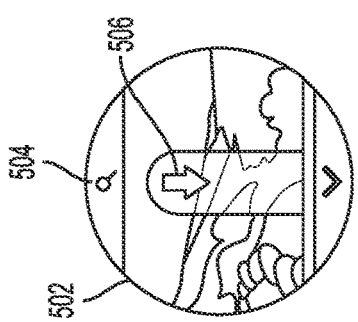
Figure 7A:
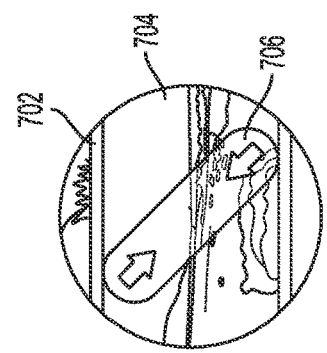
FIGS. 7(*a*), 7(*b*), 7(*c*), and 7(*d*) are illustrations of example display screens to displaying and manipulating an image on a computing device.
Figure 7B:
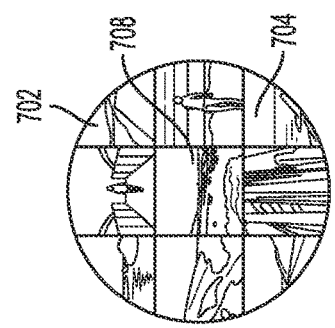
Figure 7C:
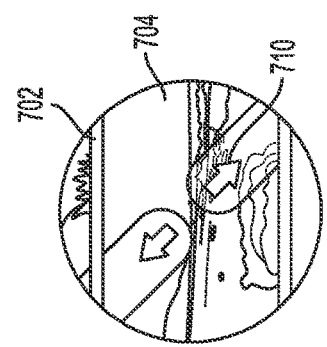
Figure 7D:
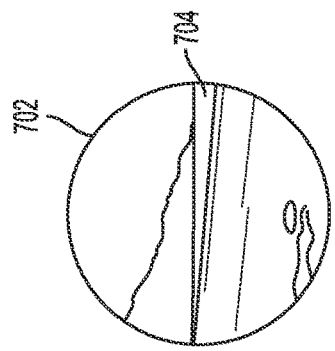

In the example, a user interface on the display screen 502 of the computing device 102 may provide a search element icon 504. In the example, the user may pull down the search element icon 504 by touching and swiping downward on the screen, as shown for illustration purposes as a pull down arrow 506. In FIG. 5 (b), the downward movement, shown for illustration purposes by down arrow 506, may result in an enlarged search element icon 504. In FIG. 5(c) the display screen 502 shows a search interface, which may fully expand and may cover a significant portion of the display screen 502, or the entire display screen 502.

In certain implementations, the user may interact with the computing device 102 through voice or touch input. For example, a microphone icon 508 indicates readiness to accept audio, e.g. voice commands. In some implementations, the display screen 502 is a multi-touch sensitive screen. A search interface 508 on the screen 502 may accept various inputs, such as touch commands, e.g. zoom in, tap, scrolling, swiping, etc. In some implementations, a computing device 102 may accept various other inputs, such as, without limitation, audio, e.g. voice recognition, touchscreen, switch input with an on-screen or external keyboard, head mouse, gesture recognition, facial recognition, movement tracker, eye movement tracker, smart buttons, trackball, track pen, pen tablet, pen, stylus, and hand mouse. The input may include a user applying touch, voice, click, tap, type, gestures, movement (e.g. moving an eye, arm, body), and other actions. In some implementations, a user contacts the display screen 502 using a finger or stylus in order to select items displayed by the display screen 502. The user may enter text or activate control functions of the computing device 102.

In some implementations, the user may input terms, such as a date or date range of when the image was captured, a description images, etc. The user may also select from a list 510 of search categories, such as one or more standard categories of images, previous queries, user preferences, album titles, etc. In the example, the list 510 includes two categories: a date type of category, "April 2015" and place type of category, "Venice Italy". Various other types of categories may also be used in the list 510. In some implementations, the list 510 of categories may be received from the communication device 120 through analysis of images by analysis module 440. For example, objects recognized by in one or more images analysis module 440 may serve as categories for list 510.

As shown in FIG. 5 (*d*) a search result interface on the display screen 502 may show one or more search result images 512 retrieved from communication device 120. The result interface may also include the search term selected from list 510. The resulting images may be scrolled by scroll element 514 and displayed from non-persistent memory 406 as copies of images stored in long term memory 404.

The collection of images received by the computing device 102 may be stored in repository 412 of long term memory 404, e.g., hard disk, and/or non-persistent memory 406, e.g. cache of the memory 424. The repository 412 may have a variety of structures that enable rapid retrieval of images for transfer to non-persistent memory 406. In some implementations, images may be indexed in repository 412 based on a timestamp. For example, when the user scrolls back and forth for images taken prior to or after the current image. In some implementations, images may be indexed according subject matter depicted in the image or by search term, e.g. the user may input a search term "tree" and images are indexed as a collection according to the search term. In this manner, images of trees may be scrolled backward and forward. In some implementations, images may be indexed in repository 412 based on combinations of time and subject matter. In still some implementations, indexing may be based on other parameters, such as an album to which the image belongs, image quality, image source 450, resolution, etc. Such indexing may enable "cache like" performance and may allow quick refilling of the non-persistent memory irrespective of how the user browses the images.

The images may be stored in repository 412 of long term memory 404 in a manner that is cache friendly to reduce cache miss rates. Images may be shrunk to small sizes to save memory space. By storing updated collections of images in long-term storage, the computing device 102 may access the images when offline and not in communication with the communication device 120.

In some implementations, a predefined number of images, e.g. a minimum threshold, received by the computing device 102 may be maintained in non-persistent memory 406 by copying images from long term memory 404 into non-persistent memory 406 for temporary storage as a particular number of images are consumed, e.g. displayed. The particular number of images reflects the number of images available for the user at any given time. As images are consumed, they may be not persistent in the non-persistent memory. For example, three images may be defined for display purposes on a computing device. A user may scroll forward and backward through the first three images of a collection from non-persistent memory. As the user scrolls to the fourth image, the computing device removes the first image from non-persistent memory to maintain the use number of three. Should the user scroll backwards to toward the first image, the computing device may remove the fourth image from non-persistent memory and reload the first image again for viewing. In various implementations, any number of images for consumption may be employed, e.g. 3, 4, 5 or 6 to 12 images.

In some implementations, a predefined number of images, e.g. minimum threshold, may be maintained in the non-persistent memory as images are consumed. In some of these instances, the non-persistent memory may be replenished when a certain number of images for consumption are consumed. For example, the predefined number of images (minimum threshold), in non-persistent memory may be 3 and the number of images for consumption may be a number, e.g. 2, that is less than the predefined number of images. In some instances of maintaining images in queue, there may be no minimum threshold and the images may be replenished in non-persistent memory as they are consumed. In these manners, the delay in providing an image to a user may be avoided or reduced. In still some implementations, the system may wait until all images in the non-persistent memory are consumed to replenish the non-persistent memory to the predefined number of images (minimum threshold). For example, the number of images for consumption may be the same as the predefined number of images (minimum threshold) or there may be not set number of images for consumption.

Images may be consumed in a variety of ways. For example, images may be displayed by a user scrolling in various directions on a display screen or pinched to zoom. Image consumption may include selecting an image for sharing or an image being set as a background image, e.g., smartwatch face, such as a background image periodically changing or changing upon a shift to an active mode of the computing device, etc.

In some implementations, the non-persistent memory may be replenished in a cyclical manner. For example, when all images have been exhausted (e.g. consumed) in a particular order, the image retrieval system 100 supplies the images to non-persistent memory again in the same order. In some implementations, the order of images provided to non-persistent memory may be a random shuffling. Other orders of images are also possible, e.g. based on image content, time of day, calendar events, location of the computing device, user preference, etc.

The computing device 102 may include one or more processors 416 and a memory 414. The processor 416 may process instruction for execution within the computing device 102 including instructions stored in memory 414. The processor may coordinate computing device components, e.g. applications, wireless or wired communication through interfaces, etc. each component coupled to a computer system bus 422. In some implementations, multiple processors and buses 422 may be used.

The processor 416 may be implemented as a chipset of chips that include separate and multiple analog digital processors. The processor may also be implemented using various architectures. For example, the processor 416 may be a CISC (Complex Instruction Set Computer) processor, RISC (Reduced Instruction Set Computer) processor or MISC (Minimal Instruction Set Computer) processor.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems.

The memory 414 stores information within the computing device 102. The memory 414 may be any suitable data storage, memory and/or non-transitory computer-readable storage media, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions (e.g., program or software instructions) for execution by the processor. For example, a tangible medium such as a hardware storage device can be used to store the control logic, which can include executable instructions. The instructions can also be contained in, and provided as, an electronic signal, for example in the form of software as a service (SaaS) delivered from a server (e.g., a distributed system and/or a cloud computing system).

The one or more processors 416 and the memory 414 may implement the editing module 408 and display controller 410. In some implementations, the editing module 408 may be a set of instructions executable by the processor 416 to edit images for consumption by computing device 102. In some implementations, the editing module 408 may be stored in the memory 414 of the computing device 102 and may be accessible and executable by the processor 416. In some implementations, the editing module 408 may be implemented using hardware including a field-programmable gate array (FPGA) or an application-specific integrated circuit (ASIC). In some other implementations, the editing module 408 may be implemented using a combination of hardware and software.

Display controller 410 may include hardware configured to display images, elements, etc., on a display screen. The display controller 410 is coupled to the bus 422 for communication with the other components of the computing device 102 via signal lines. The computing device 102 may also include other types of non-display output devices, such as a speaker for audio interfaces, a vibration or force feedback device, etc.

Memory 414 may keep applications and other data. At least a portion of the information may also be stored on other computer readable storage device (not shown) within the computing device 102. Such storage device include a floppy disk device, a hard disk device, an optical disk device, or a tape device, a flash memory or other similar solid state memory device, or an array of devices.

A computer program, also referred to as programs, software, software applications or code, may also contain instructions that, when executed, perform one or more methods, such as those described herein. The computer program may be tangibly embodied in an information carrier such as computer or machine readable medium, for example, the memory 414, a storage device or a memory on processor 416. A machine readable medium is any computer program product, apparatus or device used to provide machine instructions or data to a programmable processor.

Any suitable programming languages and programming techniques may be used to implement the routines of particular implementations. Different programming techniques may be employed such as procedural or object-oriented. The routines may execute on a single processing device or multiple processors. Any suitable component or combination of components of the image retrieval system 100 or any suitable processor or processors associated with the image retrieval system 100 may perform the steps described.

Although the steps, operations, or computations may be presented in a specific order, the order may be changed in different particular embodiments. In some particular embodiments, multiple steps shown as sequential in this specification may be performed at the same time, and/or may have other steps instead of, or in addition to, those shown herein.

Computing devices 102 that are wearable devices may have display screens that are diminutive in size and may have a variety of shapes and sizes. In some implementations, the images may be modified by editing module 408 of the computing device 102 and/or 428 of the communication device 120, prior to consumption, such as displaying by display module 410. For example, the geometric shape of the image may be modified to adapt to the display screen. The images may be cropped and resized for viewing on the display screen. In some implementations, the image may be adjusted to be presented with minimum distortion on a display screen that is flat or flexible, e.g. partially or entirely curved, bendable, rollable, etc.

The background image may be edited to change color, saturation, transparency, apply one or more filters to the image, etc. for use as a background image to contrast with display elements. Where display elements appear light, e.g. white, the background image may be darkened. In some implementations, certain objects, a foreground or backdrop may be edited differently in the image in relation to the appearance of display elements. For example, a sky in a background image may be darkened or lightened without changing a landscape depicted in the image. The background image may also be centered or positioned on the display screen relative to the position of display elements to enhance viewing of both display elements and the background image. For example, the background image may be shifted to position a focal point of the background image away from display elements to allow the focal point to be viewed without interference with display elements, e.g. watch time 108.

Images may be consumed in various ways by the computing device 102, such as shared, displayed, organized and saved, user edited, etc. Images may be shared with one or more recipients various communications, including email, instant messaging, text messaging, video conferencing, posting to websites, e.g. social media sites and blogs, peer to peer Wi-Fi, Bluetooth and near field communication connections (e.g. beaming) with various activations such as gesturing in proximity to a recipient and with the use of sensors, and other manners of communicating images.

As shown in FIGS. 6 (*a*), (*b*) and (*c*), one implementation of sharing includes selection of an image. For example, FIG. 6 (*a*) shows a strip of images with a portion of a top image, a main image 604 and a portion of a bottom image shown on a display screen 602 and that may be scrolled. In certain implementations, one or more images may be selected as indicated for illustration purposes as a dot 606, which may appear on the display on top of the selected image or may not be present on the screen. In some implementations, certain images may be deselected, such as by greying out the unselected images.

As shown in FIG. 6(*b*), a share control element 608 may be provided on a share interface along with the selected image(s) on the display screen 602. As shown in FIG. 6(*c*), a menu of sharing modalities 610 may be provided on a menu interface of the display screen 602 and one or more may be selected. Commands to instruct the computing device 102 may be inputted by various means such as touching, voice command, gesturing, etc. Some examples of voice commands may include "scroll", "share", "text", "beam", "inbox", "post", etc.

Images may be displayed in a variety of formats, such as background image, film strip presentation, grid layout, etc. A queue of images, such as 9 or more, in non-persistent memory 406 may enable quick performance of pinch to zoom actions. As shown in FIGS. 7 (*a*), (*b*), (*c*) and (*d*) a strip of images 704 may be displayed on display screen 702 and manipulated. In FIG. 7 (*a*), a select one of the images 704 may be miniaturized by zooming in as indicated for illustration purposes by diagonal facing arrows 706, e.g. pinching. As shown in FIG. 7 (*b*), a miniaturized presentation of the selected one of the images 704 may be displayed in a grid format 708 with other miniaturized images from a collection. In FIG. 7 (*c*), the select image 704 may also be expanded by zooming in as indicated for illustration purposes by diagonal opposing arrows 710. In FIG. 7 (*d*) the expanded presentation of the select image 704 may fill the display screen 702. Such zooming actions may be directed by a user with touch, voice, gestures, etc.

Figure 8:
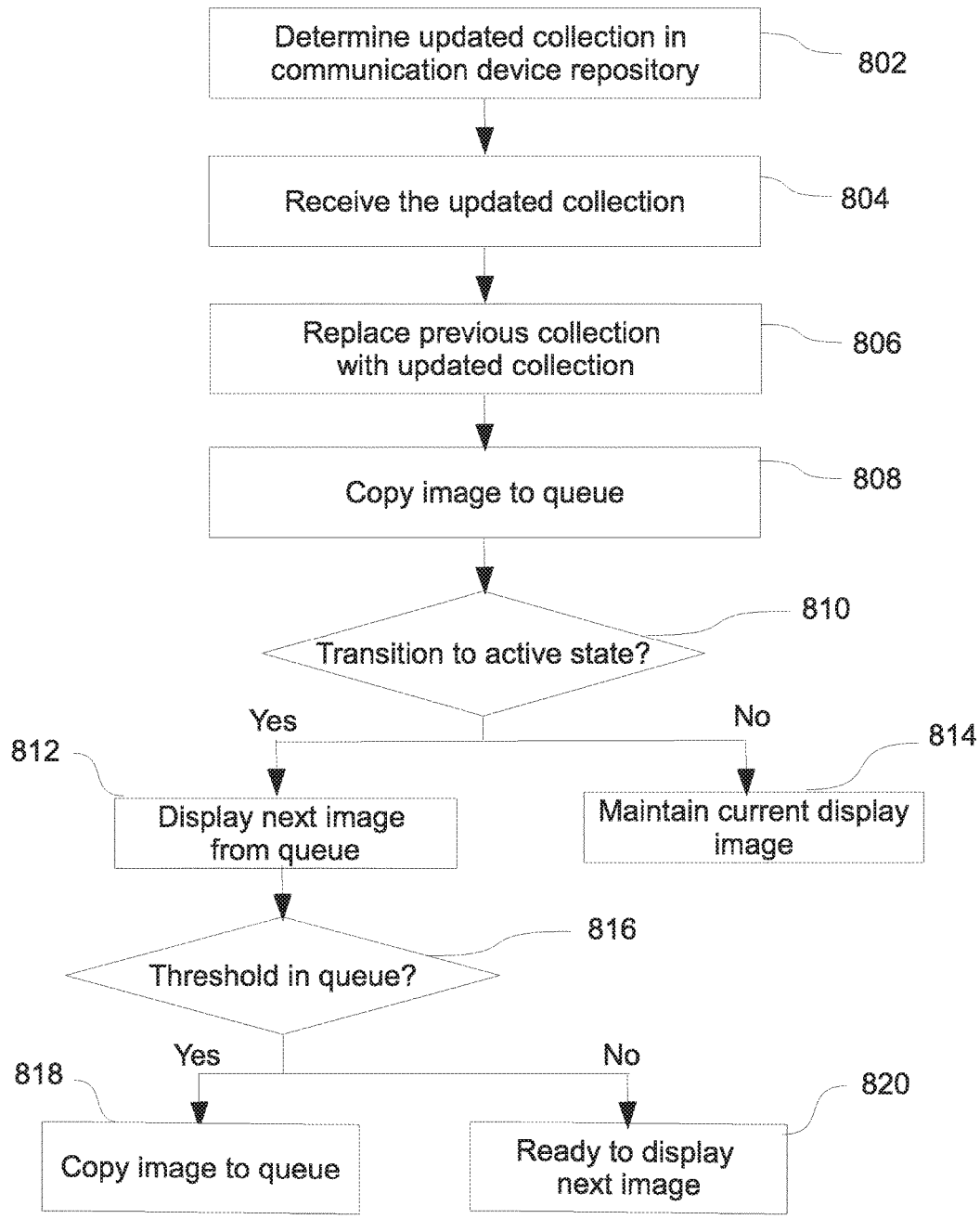
FIG. 8 is a flow diagram of an example process to collect and display an update to the image collection.

FIG. 8 shows by way of a flow chart, some implementations of collecting and displaying images, which may be performed by the processor 416 of the computing device 102, as shown in FIG. 4. The computing device 102 may communicate with a communication device 120 and in block 802, the computing device 102 may determine that an updated collection is present in a repository 426 of a communication device 120. For example, the computing device 102 may receive a notification from the communication device 120 of the updated collection, the computing device 102 may send an inquiry to the collection device for updates, etc. In some implementations, the computing device 102 may determine an update to a collection by receiving the updated collection without prior notice.

The computing device 102 may link with the communication device 120 and receive the update to the collection into a repository 412 in the computing device 102, as shown in block 804. As shown in block 806, the update to the collection may replace or augment a previous version of the collection in the repository 412 in the memory 404 of the computing device 102. In some implementations, only the new images of the update to the collection may be provided without including the images from the prior collection. In some implementations, the updated collection may be stored in the repository 412 without affecting or supplanting the previous version of the collection.

As in block 808, one or more of the images in the update collection may be copied in a queue, e.g. non-persistent memory 406. In some implementations, a queue maximum or maximum threshold of images may be designated for the queue. For example, a maximum threshold number of images, such as 6 images, defines a maximum number of images to be placed in the queue. In some instances, one or more images not exceeding a maximum threshold number, from the newly received updated collection may be copied into the queue and replenish any previous images in the queue or replace existing images in queue. In some implementations, the queue maximum threshold represents an amount of memory capacity designated for the queue. In these instances, the queue may not exceed the threshold memory capacity with stored images in the queue.

In the example shown by FIG. 8, in decision block 810, when the computing device 102 transitions from an inactive state to an active state, a next image may be retrieved from queue and displayed, as shown in block 812. In an inactive state, the device may have limited central processing unit (CPU) cycles. If such a transition has not occurred, such as if the computing device remains in an active state, the computing device may maintain the current image as a current display image, as shown in block 814. In some implementations, such as if the computing device is in an inactive state, the display may switch to a default screen, e.g. blank, until the active state transition occurs.

In some instances, as images are used from queue when the number of images in the queue reaches a threshold, e.g. minimum threshold or predefined number, as determined in block 816, the queue may be replenished by copying one or more images from the collection from long term memory, as shown in block 818. If the number of images in the queue is higher than the minimum threshold, e.g. predefined number, the next images in queue are ready to be displayed, as shown in block 820, and the queue may not be replenished. This minimum threshold value, e.g. predefined number, may be a lesser number or amount of storage than the upper limits or maximum threshold that the queue may hold. In some implementations, the queue may maintain a particular number of images or amount of memory consumed, rather than having a maximum or minimum threshold.

Figure 9:
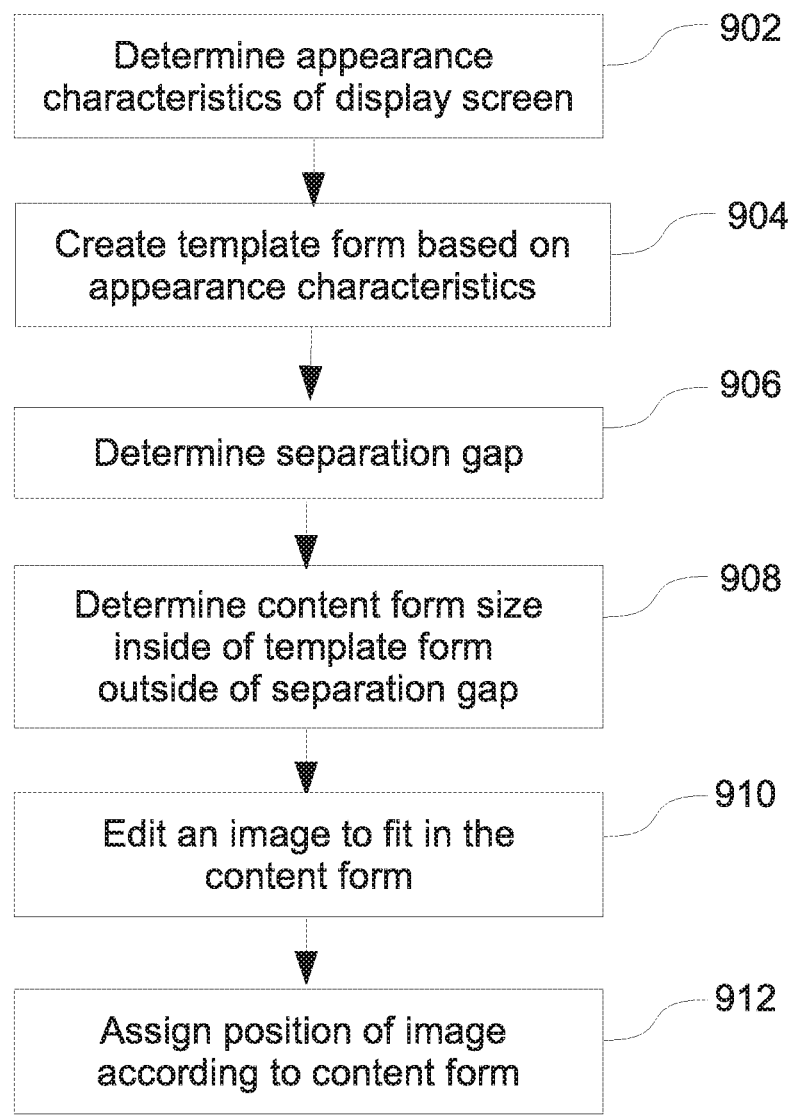
FIG. 9 a flow diagram of an example process to edit an image.

FIG. 9 shows by way of a flow chart, geometric editing of an image for a display screen (e.g. display screen 104). Geometric editing may be performed in full or in part by a computing device 102, communication device 120, an image source 440 or other computing device. In some implementations, as shown in block 902, one or more appearance characteristics of a display screen may be determined. Appearance characteristics may include one or more of shape, size, surface texture and flatness and/or sphericity of a display screen. In block 904, a template form may be created based on the appearance characteristics. A template form 304 may specify a shape for the image, e.g. square, round, elliptical etc., to match the display screen. In some examples, a template form may specify a deformation for the image e.g. to match a curvature of the display screen.

In block 906 one or more separation gaps 306 may be determined within the template form 304, for example, at or along one or more of the edges of the template form. The separation gap may serve as an area void of images on the display screen.

In block 908 one or more content form, e.g. 308, may be determined to fit by size, shape and/or position at least substantially within the template form 304 and to not overlap with the separation gap 306. In some implementations, the inner edge of the separation gap 306 may define the shape and size of the main content form 308.

In block 910, an image may be edited at least substantially based on the content form. For example, the image may be cropped and/or enlarged. In some implementations, geometric image editing of the image may include padding the periphery of the image with pixels that may be borrowed from the image. As shown in block 912, the edited image may be positioned to coincide with the content form on the display screen. In some implementations, the positioning of the image may include determining a focal object or point in the image, such as by image analysis techniques, and centering the focal object or point in the template form. In some implementations, a gap between the template form and the outer edge of the display screen may be filled with any color, e.g. solid, pattern, graphic, etc.

Figure 10:
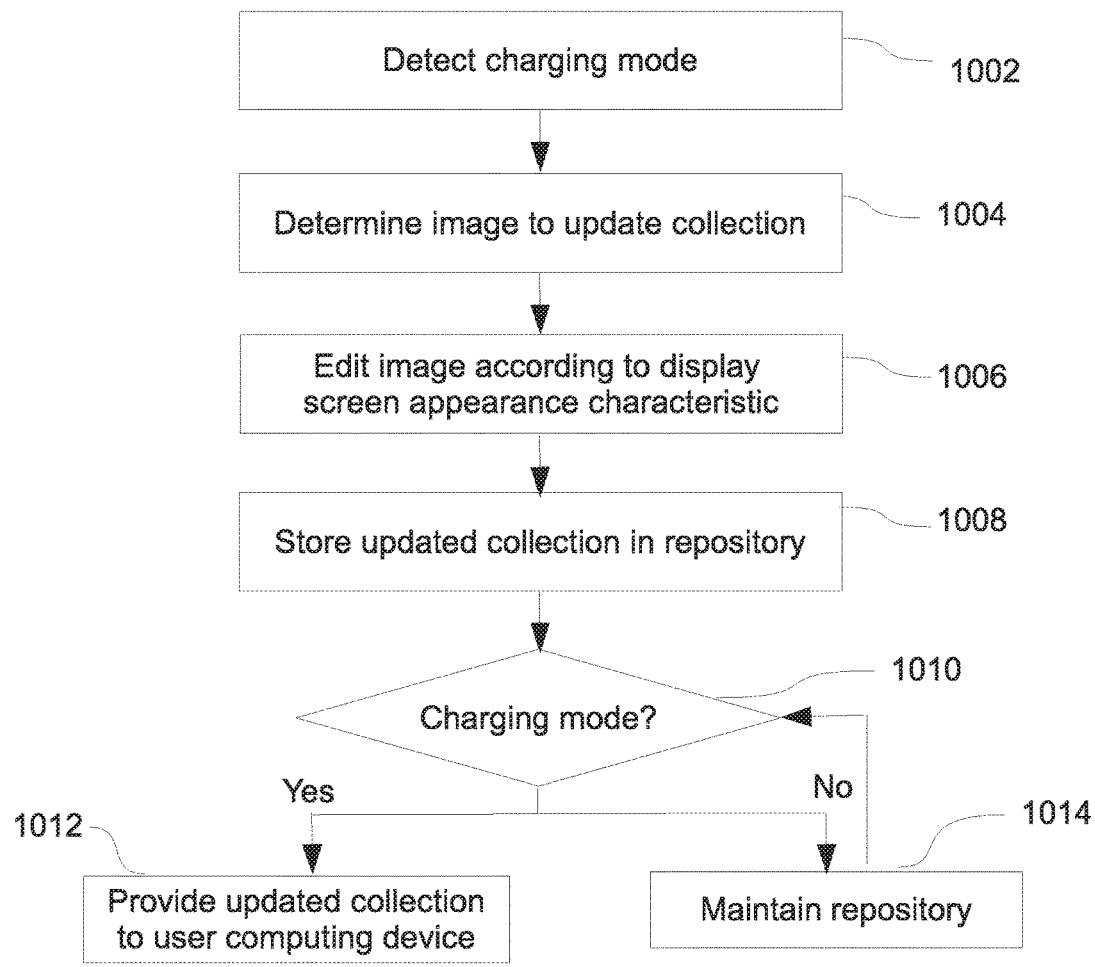
FIG. 10 is a flow diagram of an example process to collect an image and provide an update to the image collection, all in accordance with at least some implementations of the present disclosure.

FIG. 10 shows by way of a flow chart, some implementations of collecting and providing images, which may be performed by the processor 432 of the computing device 120, as shown in FIG. 4. In block 1002, a charging mode of the communication device may be detected. In block 1004, an image may be determined as belonging to a collection of images to update the collection. The image may not have previously belonged to the collection. For example, the new image may have been freshly captured or collected. In some implementations, the image have been previously captured or collected but had newly been identified as belonging to the image collection.

In block 1006, the image may be edited, for example, according to one or more appearance characteristics of a display screen of the computing device 102. Editing may include geometric editing previously described herein, and/or other editing techniques.

In block 1008, the updated collection, including the new image, may be stored in in a repository 426 for transfer to the computing device 102. In determination block 1010, a charging mode of the communication device 120 and/or computing device 102, may be detected. In response to a charging mode, the updated collection of images may be provided to the computing device, as in block 1012. The repository may be maintained, e.g. updated collection may remain in the repository on standby or may be periodically updated, until the charging mode occurs, as shown in block 1014. For example, the communication device 120 may continue to update the collection in the repository with new images while waiting for the charging mode to transfer the image collection to the computing device 102.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

A number of implementations have been described. Features described with conditional language may describe implementations that are optional. The functional blocks, methods, devices, and systems described in the present disclosure may be integrated or divided into different combinations of systems, devices, and functional blocks as would be known to those skilled in the art. Although the description has been described with respect to particular implementations thereof, these particular implementations are merely illustrative, and not restrictive. Concepts illustrated in the examples may be applied to other examples and implementations. Thus, various modifications may be made without departing from the spirit and scope of this disclosure and other implementations are within the scope of the following claims.

What is claimed is:

1. A computer implemented method executable by a communication device, the method comprising:
   determining one or more new images to update a collection of images stored on a wearable device;
   determining, by one or more processors of the communication device, appearance characteristics of a display screen of the wearable device;
   automatically editing the one or more new images according to the appearance characteristics;
   temporarily storing the edited one or more new images of the collection of images in a repository while waiting for a charging mode of the communication device, wherein the communication device is coupled to a power source when in the charging mode;
   detecting that the communication device is in the charging mode;
   in response, at least in part, to detecting that the communication device is in the charging mode, automatically establishing a communication channel with the wearable device; and
   while the communication device is in the charging mode, transmitting the edited one or more new images from the repository to the wearable device via the communication channel for storage on the wearable device as an update to the collection and for display on the wearable device when the wearable device switches from an inactive mode to an active mode.

2. The method of claim 1, wherein determining one or more new images to update the collection of images comprises determining the one or more new images meet a user search query received from the wearable device, for images to be automatically used as background display images on the wearable device.

3. The method of claim 1, wherein the appearance characteristics further include shape, surface texture, flatness, or sphericity of the display screen of the wearable device.

4. The method of claim 1, wherein editing includes:
   determining a template form for the appearance characteristics of the wearable device;
   determining a main content form within the template form to define placement of the one or more new images on the display; and
   editing the one or more new images to fill the main content form.

5. The method of claim 4, wherein editing further includes determining one or more separation gaps inside of one or more edges of the template form and wherein the main content form is sized to not overlap with the one or more separation gaps.

6. The method of claim 1, further comprising receiving a power level of the wearable device and wherein transmitting the edited one or more new images is further in response to the power level of the wearable device meeting a threshold power state of the wearable device.

7. The method of claim 4, wherein the template form further defines a deformation of the one or more new images to match a curvature of the display screen.

8. A non-transitory computer-readable medium storing instructions that, when executed by one or more processors, cause the one or more processors to perform operations by a communication device, comprising:
   determining one or more new images to update a collection of images stored on a wearable device;
   automatically editing the one or more new images according to appearance characteristics of a display screen of the wearable device, wherein the editing, for each image, includes changing at least one of a color, saturation, or transparency of at least a portion of the image, or applying a filter to at least the portion of the image;
   temporarily storing the edited one or more new images of the collection of images in a repository while waiting for a charging mode of the communication device, wherein the communication device is coupled to a power source when in the charging mode;
   detecting that the communication device is in the charging mode;
   in response, at least in part, to detecting that the communication device is in the charging mode, automatically establishing a communication channel with the wearable device; and
   while the communication device is in the charging mode, transmitting the edited one or more new images from the repository to the wearable device via the communication channel for storage on the wearable device as an update to the collection and for display on the wearable device.

9. The computer-readable medium of claim 8, wherein determining one or more new images to update the collection of images comprises determining the one or more new images meet a user search query received from the wearable device, for images to be automatically used as background display images on the wearable device.

10. The computer-readable medium of claim 8, wherein the appearance characteristics further include shape, surface texture, flatness, or sphericity of the display screen of the wearable device.

11. The computer-readable medium of claim 8, wherein editing includes:
   determining a template form for the appearance characteristics of the wearable device;
   determining a main content form within the template form to define placement of the one or more new images on the display; and
   editing the one or more new images to fill the main content form.

12. The computer-readable medium of claim 11, wherein editing further includes determining one or more separation gaps inside of one or more edges of the template form and wherein the main content form is sized to not overlap with the one or more separation gaps.

13. The computer-readable medium of claim 8, wherein the operations further comprise receiving a power level of the wearable device and wherein transmitting the edited one or more new images is further in response to the power level of the wearable device meeting a threshold power state of the wearable device.

14. The computer-readable medium of claim 11, wherein the template form further defines a deformation of the one or more new images to match a curvature of the display screen.

15. A system comprising:
   one or more processors; and
   one or more computer-readable media having instructions stored thereon that, when executed by the one or more processors, cause performance of operations by a communication device, comprising:
      determining one or more new images to update a collection of images stored on a wearable device;
      determining, by one or more processors of the communication device, appearance characteristics of a display screen of the wearable device;
      automatically editing the one or more new images according to appearance characteristics, wherein the editing, for each image, includes changing at least one of a color, saturation, or transparency of at least a portion of the image, or applying a filter to at least the portion of the image;
      temporarily storing the edited one or more new images of the collection of images in a repository while waiting for a charging mode of the communication device, wherein the communication device is coupled to a power source when in the charging mode;
      detecting that the communication device is in the charging mode;
      in response, at least in part, to detecting that the communication device is in the charging mode, automatically establishing a communication channel with the wearable device; and
      transmitting the edited one or more new images from the repository to the wearable device via the communication channel for storage on the wearable device as an update to the collection and for display on the wearable device when the wearable device switches from an inactive mode to an active mode.

16. The system of claim 15, wherein determining one or more new images to update the collection of images comprises determining the one or more new images meet a user search query received from the wearable device, for images to be automatically used as background display images on the wearable device.

17. The system of claim 15, wherein the appearance characteristics further include shape, surface texture, flatness, or sphericity of the display screen of the wearable device.

18. The system of claim 15, wherein editing includes:
   determining a template form for the appearance characteristics of the wearable device;
   determining a main content form within the template form to define placement of the one or more new images on the display; and
   editing the one or more new images to fill the main content form.

19. The system of claim 18, wherein editing further includes determining one or more separation gaps inside of one or more edges of the template form and wherein the main content form is sized to not overlap with the one or more separation gaps.

20. The system of claim 18, wherein the template form further defines a deformation of the one or more new images to match a curvature of the display screen.

* * * * *